United States Patent
Sharma et al.

(10) Patent No.: US 7,154,868 B1
(45) Date of Patent: Dec. 26, 2006

(54) SMOOTH HANDOFF VIA STATE EXCHANGE IN WIRELESS NETWORKS

(75) Inventors: Abhishek Sharma, Mount Prospect, IL (US); Michael S. Borella, Naperville, IL (US)

(73) Assignee: UTStarcom, Inc., Alameda, CA (US)

( * ) Notice: Subject to any disclaimer, the term of this patent is extended or adjusted under 35 U.S.C. 154(b) by 1015 days.

(21) Appl. No.: 10/041,436

(22) Filed: Jan. 8, 2002

(51) Int. Cl.
 *H04Q 7/00* (2006.01)
(52) U.S. Cl. ............................ 370/331; 370/338
(58) Field of Classification Search ............... 370/331, 370/338, 352; 455/439
 See application file for complete search history.

(56) References Cited

U.S. PATENT DOCUMENTS

| 6,904,033 B1* | 6/2005 | Perras et al. ............... 370/338 |
|---|---|---|
| 2002/0021681 A1* | 2/2002 | Madour ..................... 370/331 |

OTHER PUBLICATIONS

Choi et al. (A new multimedia network architecture using 3G CDMA2000 Vehicular Technology Conference, 2000. IEEE VTS-Fall VTC 2000. 52nd vol. 6, Sep. 24-28, 2000 pp. 2937-2944 vol. 6).*
3rd Generation Partnership Project 2 "3GPP2", *Wireless IP Architecture Based on IETF Protocols*, www.3gpp2.org, Version 1.0.0, Jul. 14, 2000, pp. 1-51.

* cited by examiner

*Primary Examiner*—Hassan Kizou
*Assistant Examiner*—Salman Ahmed
(74) *Attorney, Agent, or Firm*—McDonnell Boehnen Hulbert & Berghoff LLP

(57) ABSTRACT

A system and method for providing a handoff of a call from a mobile node. The call has associated state information. The call is established between the mobile node and a first RNN and the mobile node and a first PDSN. Thereafter, the mobile node roams and establishes a link between the mobile node and a second RNN. A second PDSN is selected to service the mobile node. A direct communication path is established between the first PDSN and the second PDSN.
State information of the call is exchanged between the first PDSN and the second PDSN using the communication path.

29 Claims, 14 Drawing Sheets

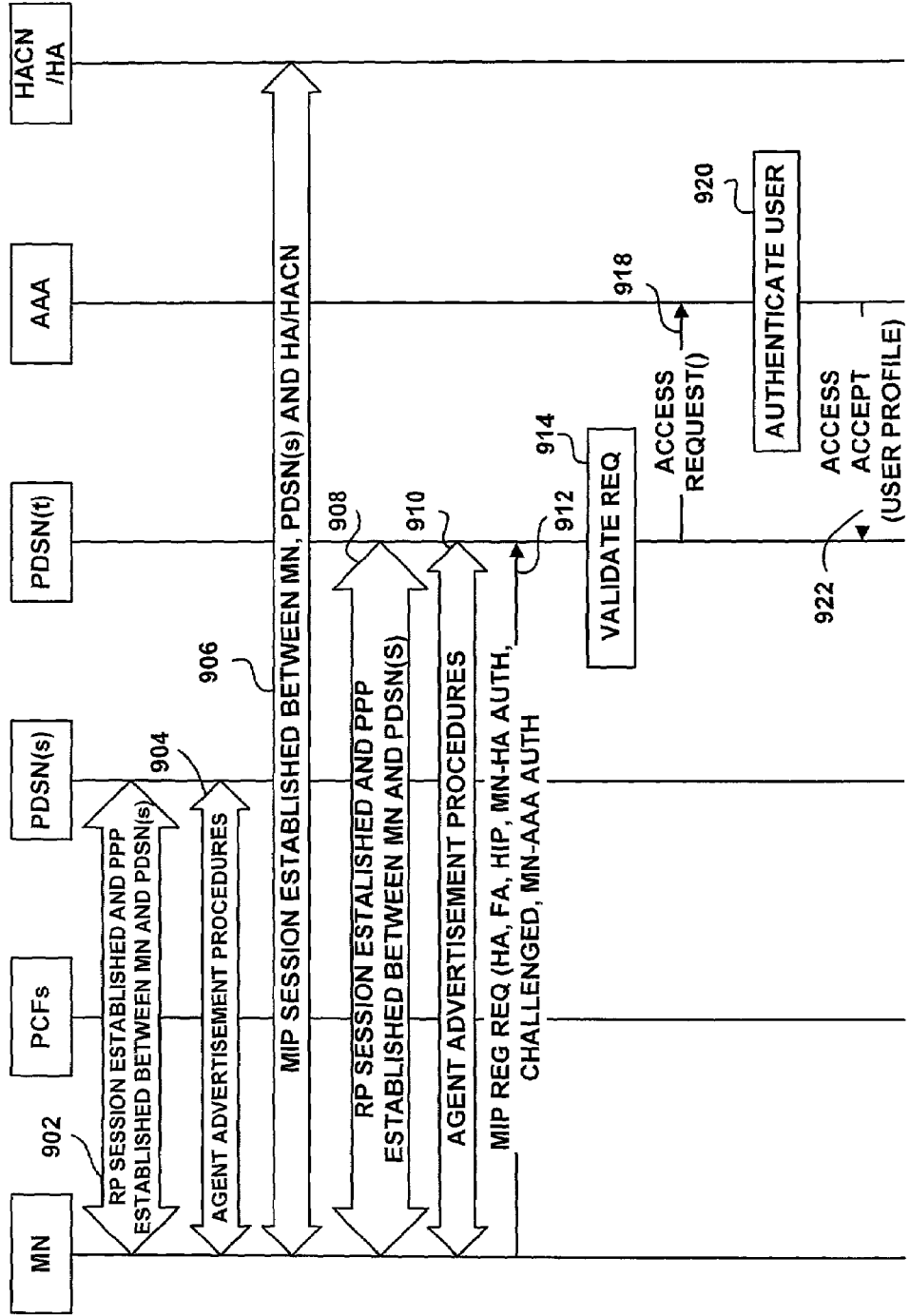

SMOOTH HANDOFF VIA STATE EXCHANGE IN WIRELESS NETWORKS

FIELD OF THE INVENTION

This present invention relates to call handoffs. More specifically, it relates to providing call handoffs for mobile nodes in communication networks.

BACKGROUND OF THE INVENTION

Third generation networks (3G) are one type of network used in telecommunication systems. As 3G networks are deployed, it is becoming important to provide services in the 3 G networks that are comparable in quality to services in other types of networks, such as wire-line remote access networks or cable networks.

The Third Generation Partnership Project 2 (3GPP2) is a collaborative third generation (3G) telecommunications standards-setting project developing global specifications for ANSI/TIA/EIA-41 Cellular Radiotelecommunication Intersystem Operations network evolution to 3G, and global specifications for the radio transmission technologies (RTTs) supported by ANSI/TIA/EIA-41. A Packet Control Function (PCF) and Packet Data Serving Node (PDSN) may communicate using a signaling protocol called A11 and a protocol called A10. Both of these functions may be defined using the 3GPP2 standards. The function are collectively referred to as the RP protocol. An IP data session for a mobile node may be established using these two protocols plus PPP to terminate a link layer session between the mobile node and the PDSN (as an RP session).

At RP tunnel setup, a tunnel may be established between the PCF and the PDSN for a call using the procedures defined in the A11 protocol. The PCF then may use this tunnel to pass data from the mobile device to the PDSN and vice versa, using procedures defined in A10. The mobile node may use PPP to access the IP network through the PDSN.

On an inter-PDSN handoff, the PCF may reestablish the RP tunnel with the new PDSN. The setup, using A11 signaling, may be conducted over a high-speed link and may not involve the mobile-end device. Link layer negotiations may involve the mobile node and require several parameter negotiations over a relatively slower radio link. The RP tunnel and the PPP layer may maintain different state information and may usually get tied to each other during initial call setup and during handoffs. For example, in an Inter-PCF/Intra-PDSN handoff, a new RP tunnel from the same PDSN but with a different PCF replaces the old R-P tunnel. The PPP layer remains unchanged.

SUMMARY OF THE INVENTION

The system and method of the present invention advantageously avoids link layer renegotiation during an inter-PDSN handoff of a mobile node in a communications network, for example, a 3GPP2 network. The system and method of the present invention allows mobile nodes fast access to the IP network, when the mobile node becomes active after a dormant state handoff. In addition, the system and method of the present invention provides for PDSN redundancy.

In one example of the present invention, a system and method is provided for making a handoff of a call from a mobile node. The call may have associated state information. The call may be established between the mobile node and a first Radio Network Node (RNN) and the mobile node and a first PDSN. Thereafter, the mobile node may roam and establish a link between the mobile node and a second RNN. A second PDSN may be selected to service the mobile node. The selection may be accomplished, for example, using a foreign agent control node (FACN) or any similar device. A direct communication path may be established between the first PDSN and the second PDSN. State information of the call may be exchanged between the first PDSN and the second PDSN using the communication path.

The foregoing and other features and advantages of the system and method for call handoffs will be apparent from the following more particular description of preferred embodiments of the system and method as illustrated in the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Exemplary Architecture

Figure 1A:
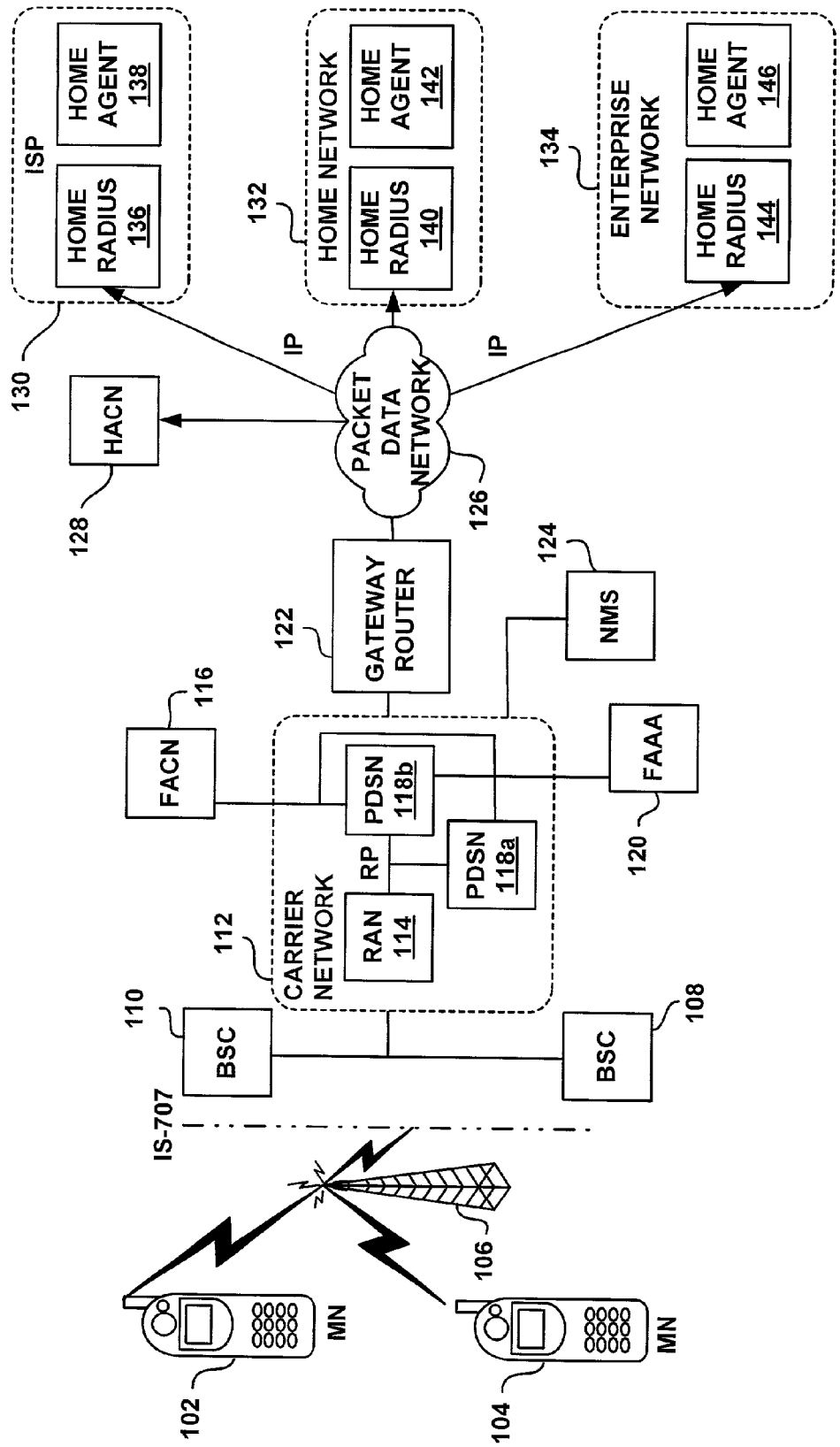
FIG. 1a is a diagram illustrating an embodiment of the system for smooth call handoffs in accordance with the present invention.

Referring now to FIG. 1a, one example of a system that performs smooth handoffs is described. The system includes mobile nodes 102 and 104, a transmitter/receiver 106, base station controllers (BSCs) 108 and 110, a carrier network 112, Radio Access Network (RAN) 114, a foreign agent control node (FACN) 116, a foreign authentication, authorization, and accounting (FAAA) server 120, a network management station (NMS) 124, a gateway router 122, a packet data network 126, a home agent control node (HACN) 128, an internet service provider (ISP) 130, a home network 132, an Enterprise network 134, a first PDSN 118a, and a second PDSN 118b. The RAN 114 may include a first Radio Network Node (RNN) and a second RNN (not shown). In addition, the RAN 114 may include only a single RNN and any handoffs may occur between two PDSNs coupled to the same RNN.

The mobile nodes 102 and 104 are coupled to the transmitter/receiver 106. The transmitter/receiver 106 is coupled, for instance using an IS-707 interface, to the BSCs 108 and 110. The BSCs 108 and 110 are coupled to the carrier network 112 and the RAN 114. The carrier network 112 is coupled to the gateway router 122. The gateway router 122 is coupled to the packet data network 126. The packet data network 126 is coupled to the HACN 128, the ISP network 130, the home network 132, and the Enterprise network 134.

The mobile nodes 102 and 104 may be any type of wireless device used for wireless communications. For example, the mobile nodes may be cellular telephones or personal digital assistants (PDAs). Other examples of mobile nodes are possible.

The transmitter/receiver 106 may be any type of device used to transmit and receive any type of information. For example, the transmitter/receiver 106 may transmit and receive information to the mobile nodes 102 and 104.

Base station controllers (BSCs) 108 and 110 may be used for controlling one or more base stations (BS), call set-up functions, signaling, the use of radio channels, and in various maintenance tasks. Other examples of functions for the BSCs 108 and 110 are also possible.

The carrier network 112 may be any type of network used to carry any type of information. For example, the network may be a CDMA 2000 network. Other examples of carrier networks are possible. The carrier network 112 includes a Radio Access Network (RAN) 114 and a first PDSN 118a and a second PDSN 118b. Although only two PDSNs are shown, it will be understood that any number of PDSNs may be included in the carrier network.

The RAN 114 may include a plurality of packet control functions in a plurality of radio network nodes (RNNs). The packet control functions may include establishing, maintain and terminate layer 2 connection to the PDSN; interacting with PDSN for dormant handoff; maintaining knowledge of radio resources; relaying packets to and from PDSN; performing flow control on packets from PDSN based on radio resources available; performing inter PCF communication for handoffs; mapping mobile station ID and connection reference to a unique layer 2 identifier used to communicate with PDSN; and collecting and sending airlink accounting record information to the PDSN.

The mobile nodes 102, 104 may register with an RNN/PCF and PDSN 118a, 118b. As the mobile nodes roam between coverage areas in the RAN 114, they may be re-registered to different RNN/PCF and PDSN pairs.

The functions of the FACN 116 may be implemented with a processor executing computer instructions stored in a memory. The FACN 116 may facilitate load balancing, redundancy, and fail over. In addition, the FACN 116 may provide registration for a mobile node and provide re-registration for a mobile node. Other examples of FACN functions are possible.

The functions of the FAAA server 120 may be implemented with a processor executing computer instructions stored in a memory. The FAAA server 120 may authenticate the mobile user, provide specific configuration options for the user, and provide routing information to the MIP registration packets (i.e., to specify to which HA/HACN the registration request is to be forwarded).

The network management station (NMS) 124 may provide operations and maintenance functions for the system. For instance, the NMS 124 may perform the network management functionality using SNMP. The NMS 124 may communicate with the cards in the chassis through the back plane of the chassis. The NMS 124 may make requests to each of the cards in the system and communicates that information to user. The NMS 124 may handle the traps generated by each of the cards, collect statistics, and convey configuration information to each of the cards.

The functions of the gateway router 122 may be implemented using a processor executing computer instructions stored in a memory. The gateway router 122 may be a logical gateway or physical gateway. For example, the gateway router 122 may include several physical gateways. In another example, the gateway router 122 may be a logical gateway and this logical gateway includes multiple physical gateways. The gateway router 122 may be used to route calls between the carrier network 112 and the packet data network 126.

The packet data network 126 may be any type of network used to transmit any type of information. For example, they may be IP networks, an Internet, a Public Switched Telephone Network (PSTN), or a wireless network. They may also be local area networks (LANs) or wide area networks (WANs) or have any other type of configuration. In addition, the networks 118 and 132 may be combinations of networks.

The functions of the HACN 128 may be implemented with a processor executing computer instructions stored in a memory. The HACN 128 may facilitate load balancing, redundancy, and fail over between HAs. In addition, the HACN 128 may provide registration for a mobile node, provide re-registration for a mobile node, assign a role to an HA, maintain a heartbeat with an HA, synchronize its activities with the HA, and provide for the dynamic discovery of HAs. Other functions of the HACN are also possible.

The ISP 130, a home network 132, and an Enterprise network 134 may be any network or combinations of networks. Each of these elements may include a home RADIUS server and a home agent (respectively, home radius servers 136, 140, and 144, and home agents 138, 142, and 146). The home RADIUS server may provide Authentication Authorization and Accounting (AAA) functions. The home agents 138, 142, and 146 may be any function found in home agents, as is know in the art.

The carrier network 112 includes a radio access node (RAN) 114 and a PDSN 118. The ISP network 130 includes a home radius server 136 and a home agent 138. The home network 132 includes a home RADIUS server 140 and a home agent 142. The Enterprise network 134 includes a home RADIUS server 144 and a home agent 146.

Figure 1B:
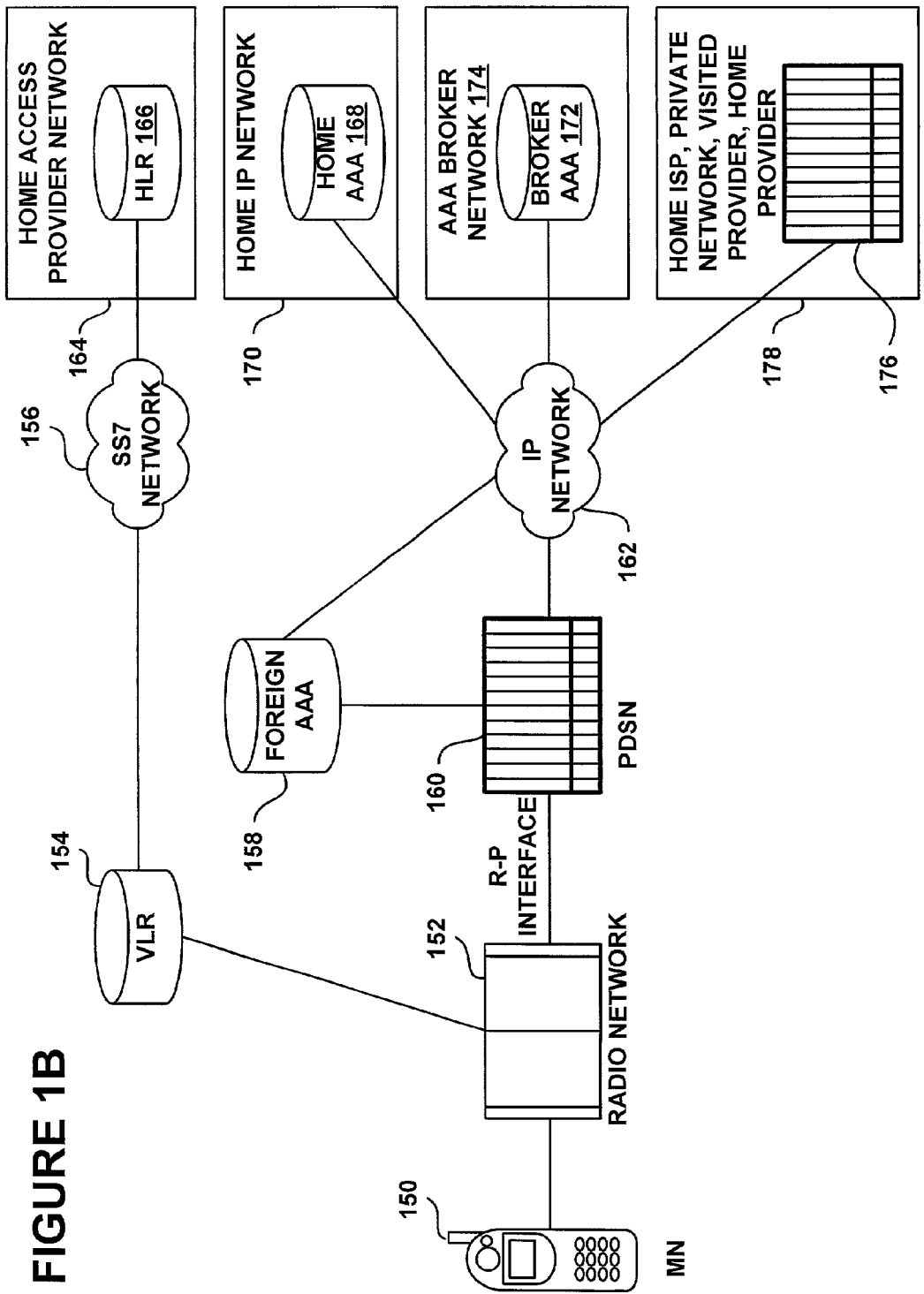
FIG. 1b is a diagram illustrating another embodiment of a system for smooth call handoffs in accordance with the present invention.

Referring now to FIG. 1*b*, another example of a system for smooth call handoffs includes a mobile node 150, a radio network 152, a visitor location register (VLR) 154, an SS7 network 156, an FAAA 158, a PDSN 160, an IP network 162, a home access provider network 164 (include a home location register (HLR) 166), a home IP network 170 (including a HAAA 168), a AAA broker network 174 (including a Broker AAA 172) and a home ISP 178 (including a HA 176). FIG. 1*b* illustrates a mobile IP (MIP) network. However, the omission of element 178 creates an IP network.

The mobile node 150 is coupled to the radio network 152. The radio network 152 is coupled to the VLR 154 and the PDSN 160. The PDSN 160 is coupled to the FAAA 158 and the IP network 162. The FAAA is also coupled to the IP network 162. The VLR 154 is coupled to the SS7 network 156. The SS7 network 156 is coupled to the home access network 164. The IP network 162 is coupled to the home IP network 170, the AAA broker network 174, and the Home ISP 178.

The mobile node 150 may be any type of wireless device used for wireless communications. For example, the mobile node may be a cellular telephone or PDA. Other examples of mobile nodes are possible.

The radio network 152 may be any type of wireless network used to provide communication between different entities. For example, the radio network may be a CDMA 2000 network.

The VLR 154 may be part of the MSC and may keep track of visiting mobiles when they roam into the network. The VLR 154 may also get the authentication and authorization information for the visiting mobiles from their home network via the SS7 network 156 and home networks Home Location Register (HLR) 166.

The SS7 network 156 is a signaling network that provides signaling communications between the mobile node and a destination (e.g., the networks 164, 170, 174, and 178). The communications may be according to the Signaling System 7 (SS7) format. However, the SS7 network may be replaced by any signaling network using any type of signaling communications in any type of format.

The functions of the FAAA server 158 may be implemented with a processor executing computer instructions stored in a memory. The FAAA server 158 may authenticate the mobile user, provide specific configuration options for the user, and provide routing information to the MIP registration packets (i.e., to specify to which HA/HACN the registration request is to be forwarded).

The functions of the first and second PDSNs within the bank 160 may include, for example, establishing, maintaining, and terminating the PPP link protocol or any function listed in the 3GPP2 Wireless IP Architecture protocol.

The IP network 162 may be any type of packet network. For example, it may be the Internet. However, other examples of IP networks are possible.

The home access provider network 164 may be the primary or home service provider of the mobile user may keep track of the services and service usage of the mobile user.

The home IP network 170 may be a Home ISP, corporate network, or private home network in which the mobile user is already registered for internet service.

The AAA broker network 174 may be any network that provides AAA functions. In addition, as described elsewhere in this specification, the network may supply a AAA that acts as a broker.

The home ISP 178 may be an Internet service provider that provides the mobile user Internet access via its network.

Exemplary Operation

In one example of the operation of FIG. 1*a*, a simple IP call is activated between the mobile node 102 (having an associated user), a first RNN, and the PDSN 118*a*. The mobile node 102 roams to a new coverage area and establishes contact with a second RNN. The second RNN sends a registration request message to the FACN 116. The FACN 116 selects the second PDSN 118*b* to handle the call.

The second RNN sends the registration request to the second PDSN 118*b*. The second PDSN 118*b* sends the registration request to the FACN 116. The FACN 116 returns the IP address of the first PDSN 118*a*. The second PDSN 118*b* sends a request to the first PDSN 118*a* for the first PDSN 118*b* to supply PPP state information to the second PDSN 118*b*.

The second PDSN 118*b* receives the requested information and brings up the PPP interface, ties a new tunnel to the PPP interface, and sends the second RNN a registration reply message as an indication of success. At this point, the call is active, and the hand-off is complete.

In another example of the operation of FIG. 1*a*, a simple IP call may be active with the first PDSN 118*a*, a mobile node 102, and a first RNN/PCF and a A11 tunnel may be active between PCF and PDSN. The first PDSN 118*a* may send PPP state information to the FACN 116, for instance, periodically, or whenever the state information changes. The mobile node 102 may roam to a second RNN/PCF and send the second RNN/PCF a registration request message. The second RNN/PCF forwards this registration request message to the FACN 116. The FACN 116 selects the second PDSN 118*b*. The second RNN/PCF sends the registration request to the second PDSN 118*b*. The second PDSN 118*b* sends a message to the FACN 116 with the IMSI and NAI of the mobile and the FACN 116 returns the state information to the user. The second PDSN 118*b*, upon successful receipt of the state information, may activate a PPP interface between Mobile Node and PDSN, tie a new A11 tunnel with the just-created PPP interface and send the RNN/PCF an A11 registration reply of success. At this point, the call is active and the handoff is complete.

In another example of the system of FIG. 1*a*, an IP call is active with the first PDSN 118*b*, a first RNN/PCF, and the mobile node 102. The mobile node 102 roams and establishes a communication link with a second RNN/PCF. The second RNN/PCF sends a registration request message to the second PDSN 118*b*, including a record. The record may include the IP address of the first PDSN 118*a*. The second PDSN 118*b* sends a message to the first PDSN 118*a*, based upon a predefined message protocol, to request the exchange of PPP state information. The first PDSN 118*a*, upon the reception of the message, creates a message with the PPP state information for the user and also clears the local PPP session. The second PDSN 118*b*, upon successful reception of the state information, brings up a PPP interface between Mobile Node and PDSN, ties a new A11 tunnel with the just-activated PPP interface and sends the second RNN/PCF an A11 registration reply of success. The call is now active and the handoff is complete.

In one example of the operation of FIG. 1*b*, a call is ongoing between the mobile node 150 and another a user (e.g., on any of the networks 130, 132, or 134) and a PDSN bank 160 (including a first PDSN and a second PDSN) and a first RNN within the radio network 152. The mobile node 150 roams to another cell and a communication link is established with a second RNN within the radio network 152. A handoff is required between the first RNN/PDSN pair and the second RNN/PDSN pair. The second PDSN may be selected by a broker entity, for example, by a FACN (not shown). Alternatively, the second RNN may select the second PDSN. The handoff may occur using a number of different methods. For instance, the first PDSN (within bank 160) may download PPP state information to the second PDSN 160 (within bank 160) and the session is transferred.

In another example, the first PDSN and second PDSN may directly communicate the state information. Each PDSN may be configured with the address of the other PDSN.

In a further example, a broker entity (e.g., the broker AAA 172) may communicate with the first PDSN and the second PDSN and direct the transfer of state information.

In yet another example, the broker entity (e.g., the broker AAA 172) may cache the PPP state information from the first PDSN and may transfer the state information to the second PDSN.

In still another example, the second PDSN may receive the IP address of the first PDSN during RP tunnel setup and then the first PDSN and the second PDSN communicate directly.

In all of the examples, the first PDSN and the second PDSN may exchange state information using any standard UDP based protocol using any agreed UDP port. The second PDSN may need to provide a unique set of parameters identifying the user of the mobile node 150. For example, these parameters may include the mobile IMSI/ESN and the mobile NAI. The second PDSN may need a variety of state information to activate the call. For example, this state information may include Asynch Control Character Map (ACCM), LCP negotiated options list, IP address, AAA or RADIUS profile, compression parameters and compression dictionary (to avoid packet loss), and header compression parameters. Other examples are possible.

Figure 2:
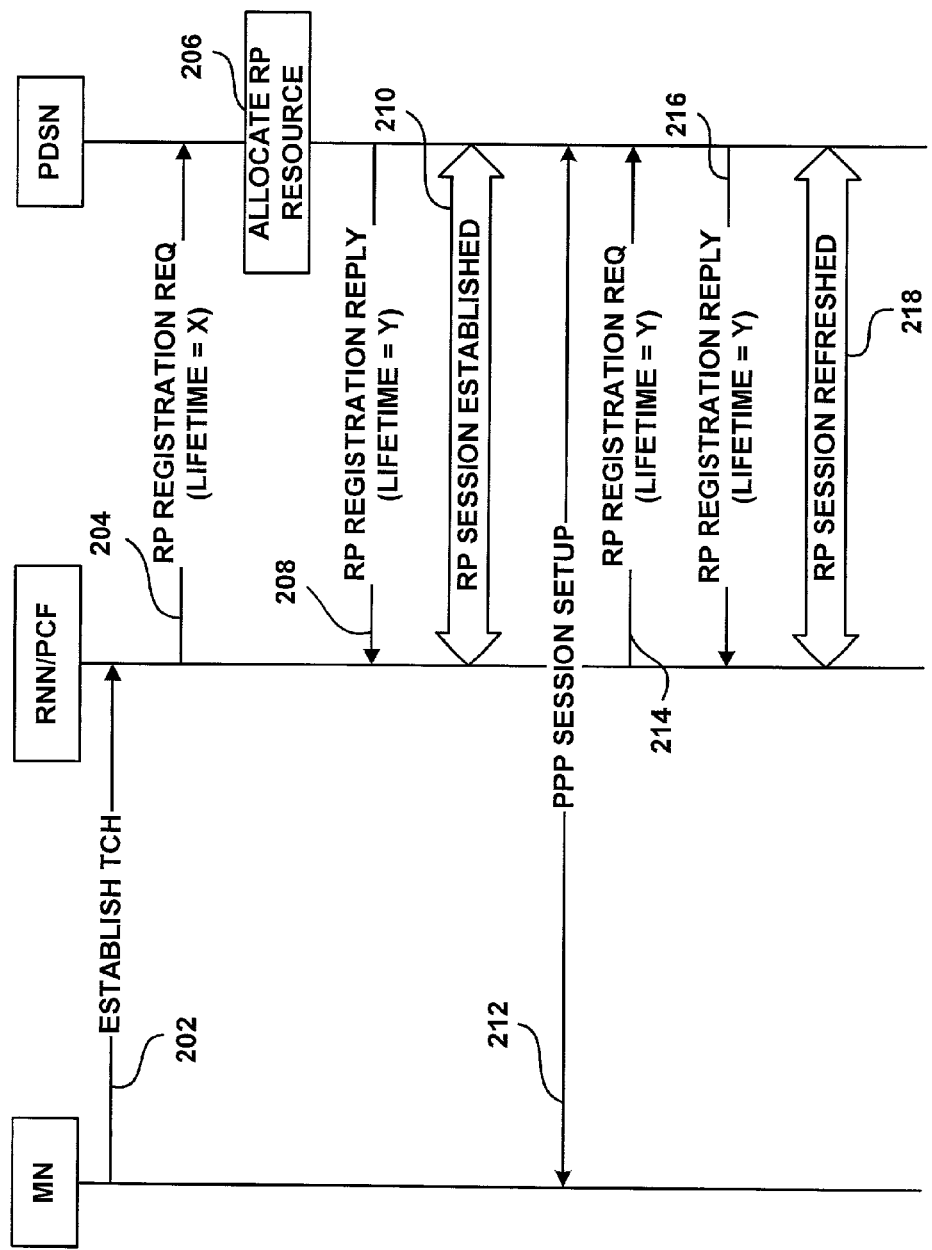
FIG. 2 is a call-flow diagram illustrating the setup of an RP session in accordance with a preferred embodiment of the present invention.

Referring now to FIG. 2, one example of an RP session setup is described. At step 202, an Establish TCH message is sent from a mobile node to the RNN/PCF. The purpose of this message is establish a traffic channel between the RAN and the Mobile node. At step 204, an RP registration request message is sent from the RNN/PCF to the PDSN. At step 206, the PDSN allocates RP resources. At step 208, an RP registration reply message is sent from the PDSN to the RNN/PCF. At step 210, an RP session is established. At step 212, PPP session setup occurs between the PDSN and the mobile node. At step 214, an RP registration request message is sent from the RNN/PCF and the PDSN. At step 216, an RP registration reply is sent from the PDSN to the RNN/PCF. At step 218, the RP session has been refreshed.

Figure 3:
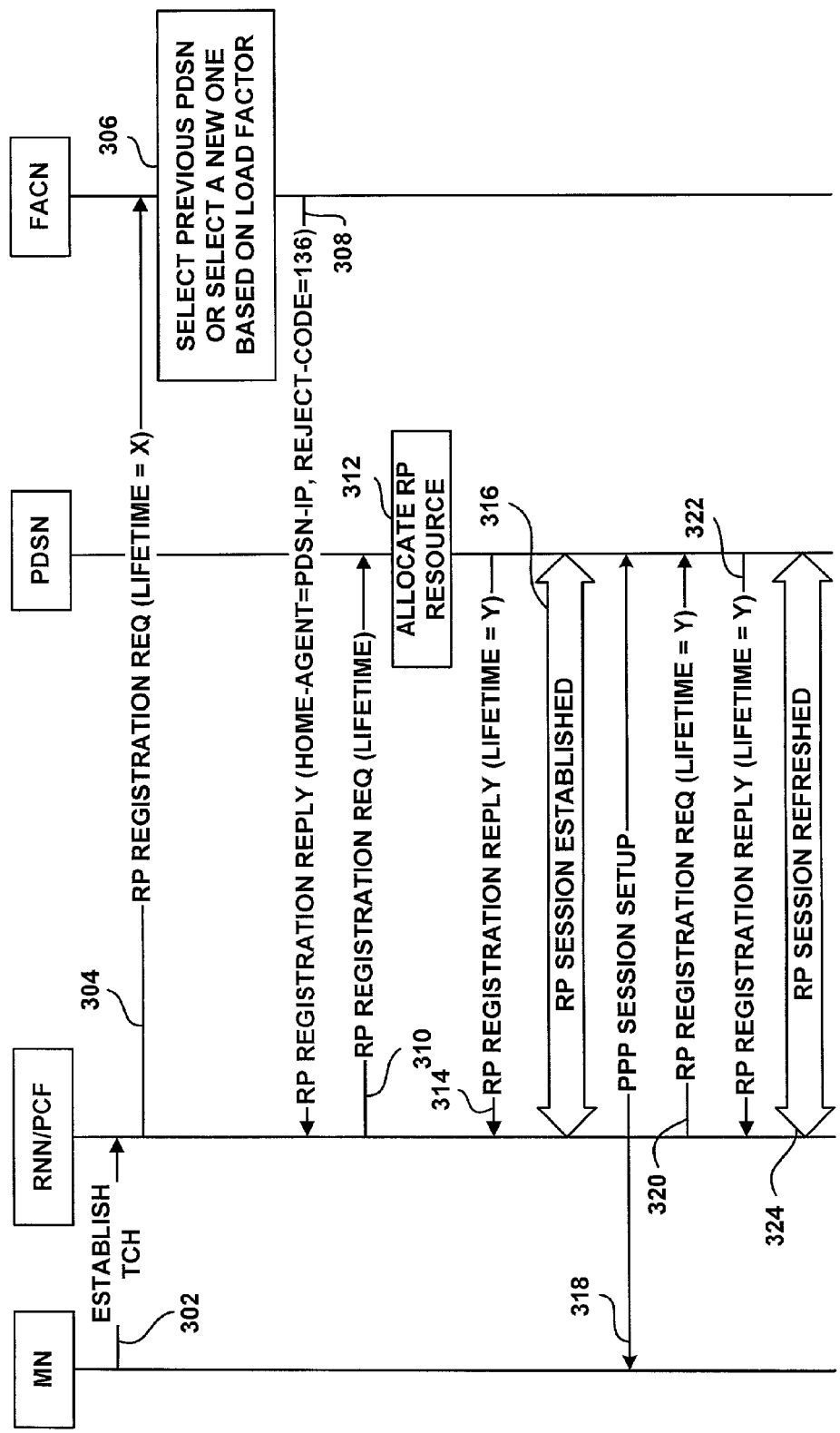
FIG. 3 is a call-flow diagram illustrating one example of RP session setup using a FACN to select the PDSN in accordance with a preferred embodiment of the present invention.

Referring now to FIG. 3, one example of RP session setup using a FACN to select the PDSN is described. At step 302, an Establish TCH message is sent from the mobile node to the RNN/PCF. At step 304, an RP Registration Request message is sent from the RNN/PCF to the FACN. At step 306, the FACN may select any PDSN based on some predetermined factor. For instance, the FACN may select the PDSN based upon a load factor. Other factors may also be used by the FACN to select the PDSN.

At step 308, the FACN sends a RP Registration Reply message to the RN/PCF. The message may include the address of the PDSN. At step 310, the RNN/PCF sends an RP Registration Request to the PDSN (selected by the FACN).

At step 312, the PDSN allocates RP resources. At step 314, the PDSN sends an RP Registration Reply message to the RNN/PCF. At step 316, an RP session has been established.

At step 318, PPP session setup occurs between the mobile node and the PDSN. At step 320, an RP Registration Request message is sent from the RNN/PCF to the PDSN. At step 322, the PDSN sends an RP Registration Reply message to the RNN/PCF. At step 324, the RP session has been refreshed.

Figure 4:
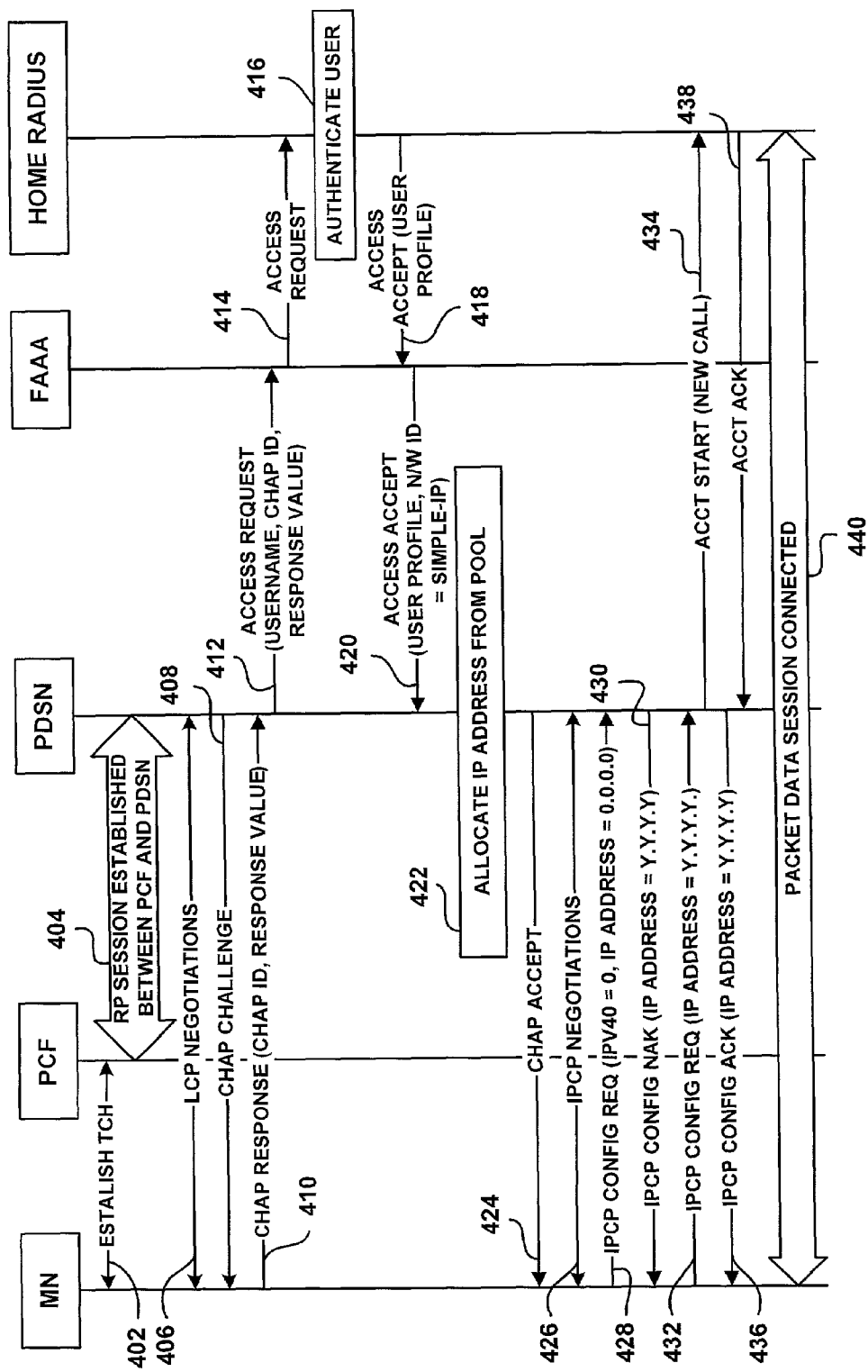
FIG. 4 shows a call-flow diagram illustrating one example of CHAP call setup in accordance with a preferred embodiment of the present invention.

Referring now to FIG. 4, one example of CHAP call setup is illustrated. At step 402, an Establish TCH message is sent from the mobile node to the PCF. At step 404, an RP session is established between the PCF and the PDSN. At step 406, LCP negotiations occur between the mobile node and the PDSN. At step 408, a CHAP challenge message is sent from the PDSN to the mobile node. At step 410, a CHAP response message is sent from the mobile node to the PDSN. For example, the response may include the CHAP identification number. At step 412, an access request message is sent from the PDSN to the FAAA. For example the message may include the username, CHAP ID, and a response value. At step 414, the access request message is sent from the FAAA to the home RADIUS server. At step 416, the home RADIUS server authenticates the user. At step 418, the home RADIUS server sends an access accept message to the FAAA. For example, the access accept message may include the user profile.

At step 420, the access accept message is sent from the FAAA to the PDSN. The access accept message may include the user profile and a network identifier. At step 422, the PDSN may allocate an IP address from the local pool. At step 424, a CHAP accept message may be sent from the PDSN to the mobile node. At step 426 IPCP negotiations occur between the PDSN and the mobile node. At step 428, the mobile node sends an IPCP configuration request to the PDSN. At step 430, the PDSN sends a NAK to the mobile node. When the reply is sent back and a different value for a parameter is proposed a NAK with a new value is sent back. Once both side agree on the value, an ACK is sent. At step 432, the mobile node sends an IPCP Configuration Request to the PDSN. At step 434. An accounting Start message is sent from the PDSN to the home RADIUS server. At step 436, an IPCP Configuration acknowledgement message is sent from the PDSN to the mobile node. At step 438, an accounting acknowledgement message is sent from the home RADIUS server to the PDSN. At step 440, the packet data session has been connected.

Figure 5:
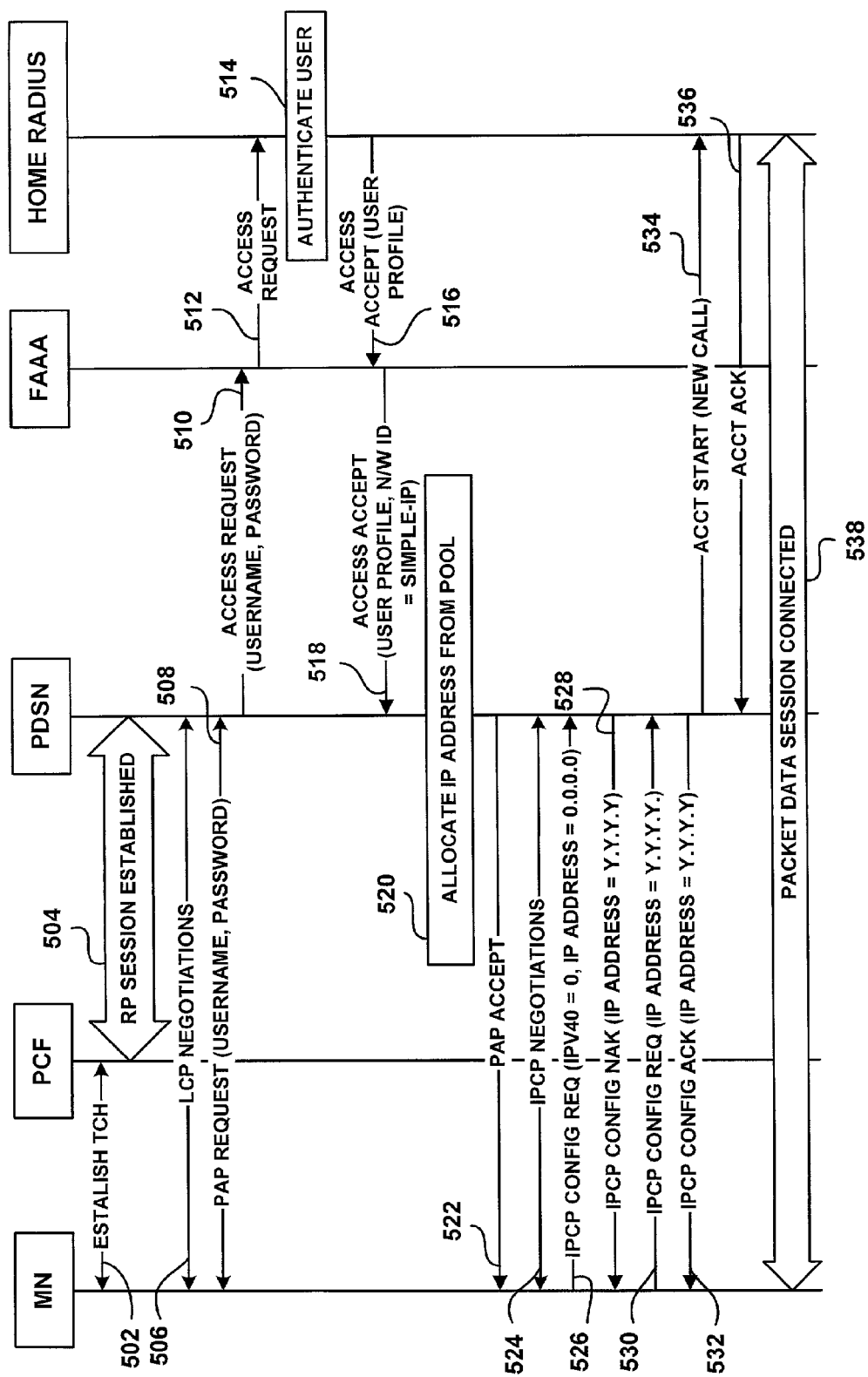
FIG. 5 shows a call-flow diagram showing simple IP call connect using PAP in accordance with a preferred embodiment of the present invention.

Referring now to FIG. 5, one example of simple IP call connect using PAP is described. At step 502, an Establish TCH message is sent from the mobile node to the PCF. At step 504, an RP session is established between the PCF and the PDSN. At step 506, LCP negotiations occur between the mobile node and the PDSN. At step 508, a PAP request message is sent from the PDSN to the mobile node. The purpose of the PAP request message is to authenticate the mobile user in the network for the requested service.

At step 510, an access request message is sent from the PDSN to the FAAA. For example the message may include the username and password. At step 512, the access request message is sent from the FAAA to the home RADIUS server. At step 514, the home RADIUS server authenticates the user. At step 516, the home RADIUS server sends an access accept message to the FAAA. For example, the access accept message may include the user profile.

At step 518, the access accept message is sent from the FAAA to the PDSN. The access accept message may include the user profile and a network identifier. At step 520, the PDSN may allocate an IP address from the local pool. At step 522, a PAP accept message may be sent from the PDSN to the mobile node. At step 524 IPCP negotiations occur between the PDSN and the mobile node. At step 526, the mobile node sends an IPCP configuration request to the PDSN. At step 528, the PDSN sends a NAK to the mobile node. At step 530, the mobile node sends an IPCP Configuration Request to the PDSN. At step 532, an IPCP Configuration acknowledgement message is sent from the PDSN to the mobile node. At step 534, an accounting Start message is sent from the PDSN to the home RADIUS server. At step 536, an accounting acknowledgement message is sent from the home RADIUS server to the PDSN. At step 538, a packet data session has been connected.

Figure 6:
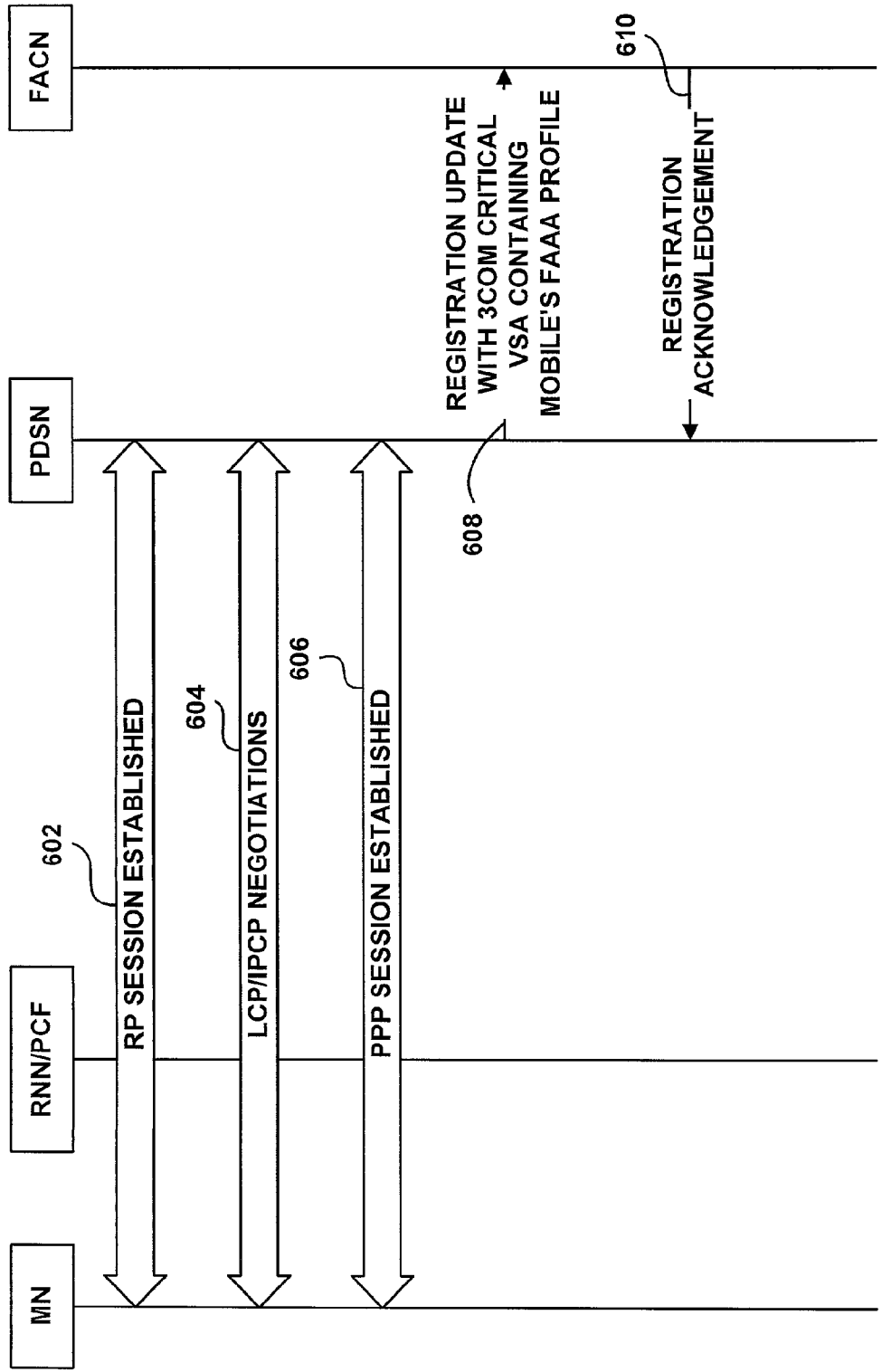
FIG. 6 shows a call-flow diagram illustrating call setup with the FACN in accordance with a preferred embodiment of the present invention.

Referring now to FIG. 6, one example of IP call setup using the FACN is described. At step 602, an RP session is established between the mobile node and the PDSN. At step 604, LCP/IPCP negotiations occur between the MN and the PDSN. The purpose of these negotiations is to setup layer 2 (link layer) and layer 3 network parameters for the mobile user. At step 606, a PPP session is established between the mobile node and the PDSN. At step 608, a registration update, for example, including the FAAA profile of the mobile node, is sent from the PDSN to the FACN. At step 610, a Registration Acknowledgement message is sent from the FACN to the PDSN.

Figure 7:
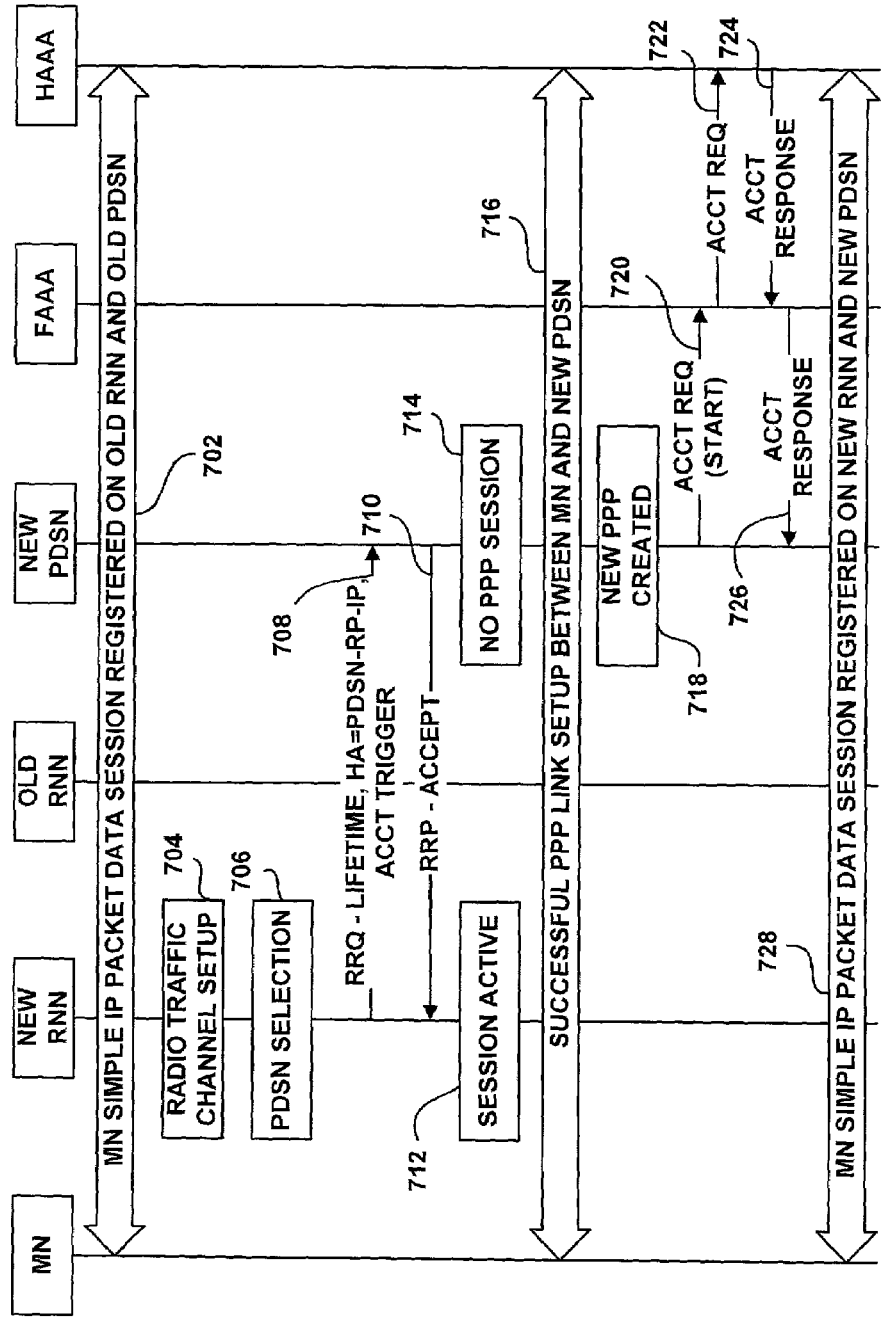
FIG. 7 shows a call-flow diagram illustrating one example of a simple IP inter-RNN and Inter PDSN handover in accordance with a preferred embodiment of the present invention.

Referring now to FIG. 7, one example of a simple IP inter-RNN and Inter PDSN handover is described. At step 702, a mobile node has established a session, which is registered on a first RNN and a first PDSN. At step 704, radio traffic channel setup occurs. At step 706, PDSN selection occurs at a second RNN. At step 708, a registration request is sent from the second RNN to the second PDSN. For example, the message may include, the lifetime value, the address of the PDSN, and an accounting trigger. Accounting triggers are defined in the 3GPP2 specifications and are a way to keep track of the state of the call and network usage for billing purposes and may for other value added features. At step 712, a session is active at the second RNN. At step 714 no PPP session is active at the second PDSN. At step 716, a successful PPP link is setup between the mobile node and the second PDSN. At step 718 a new PPP session is created. At step 720, an accounting request message is sent from the second PDSN to the FAAA. At step 722, the accounting request message is sent from the FAAA to the HAAA. At step 724, the HAAA send an accounting response to the HAAA. At step 726, an accounting response is sent from the FAAA. At step 728, the mobile node has established a simple IP data session, which is registered on the second RNN and the second PDSN.

Figure 8:
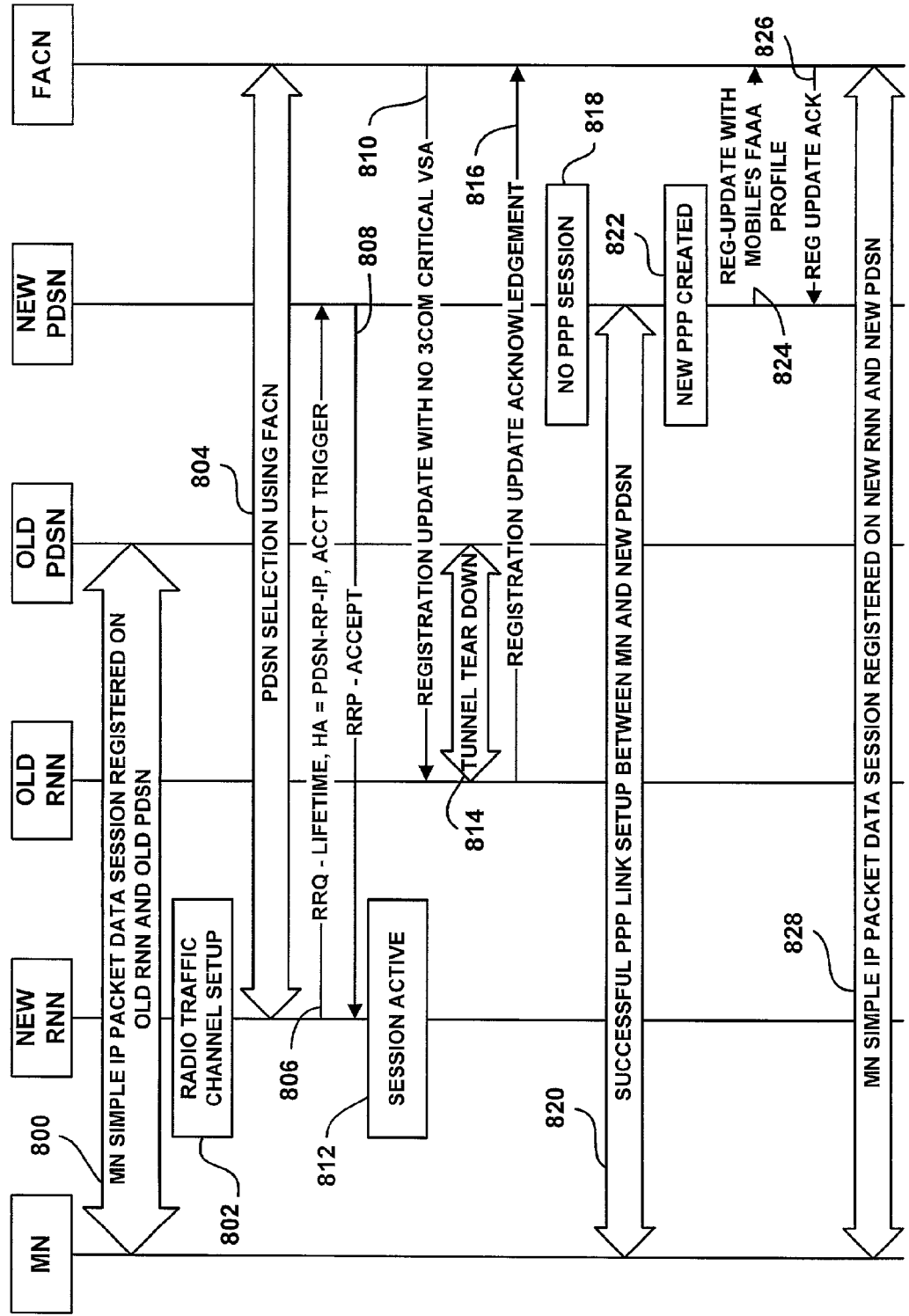
FIG. 8 shows a call-flow diagram a simple IP inter-RNN, inter PDSN handover using a FACN in accordance with a preferred embodiment of the present invention.

Referring now to FIG. 8, a simple IP inter-RNN, inter PDSN handover using a FACN is described. At step 800, the mobile node establishes a simple IP packet data session using a first RNN and a first PDSN. At step 802, radio traffic channel setup occurs. At step 804, PDSN selection at the FACN occurs. At step 806, a registration request message is sent a registration request is sent from the second RNN to the second PDSN. For example, the message may include, the lifetime value, the address of the PDSN, and an accounting trigger.

At step 808 a registration accept message is sent from the second PDSN to the second RNN. At step 810, a registration update is sent from the FACN to the first RNN. At step 812, a session is active at the second RNN. At step 814, tunnel tear-down occurs. At step 816, a registration update acknowledgement occurs between the first RNN and the FACN. At step 818, no PPP session is occurring at the second PDSN. At step 820, a link has been successfully created between the mobile node and the second PDSN. At step 822, the new PPP session is active on the second PDSN. At step 824, an update message is sent from the second PDSN to the FACN. At step 826, a registration update acknowledgement message is sent from the FACN to the second PDSN. At step 828, the mobile node has registered a simple IP packet data session on both the second RNN and the second PDSN.

Figure 9B:
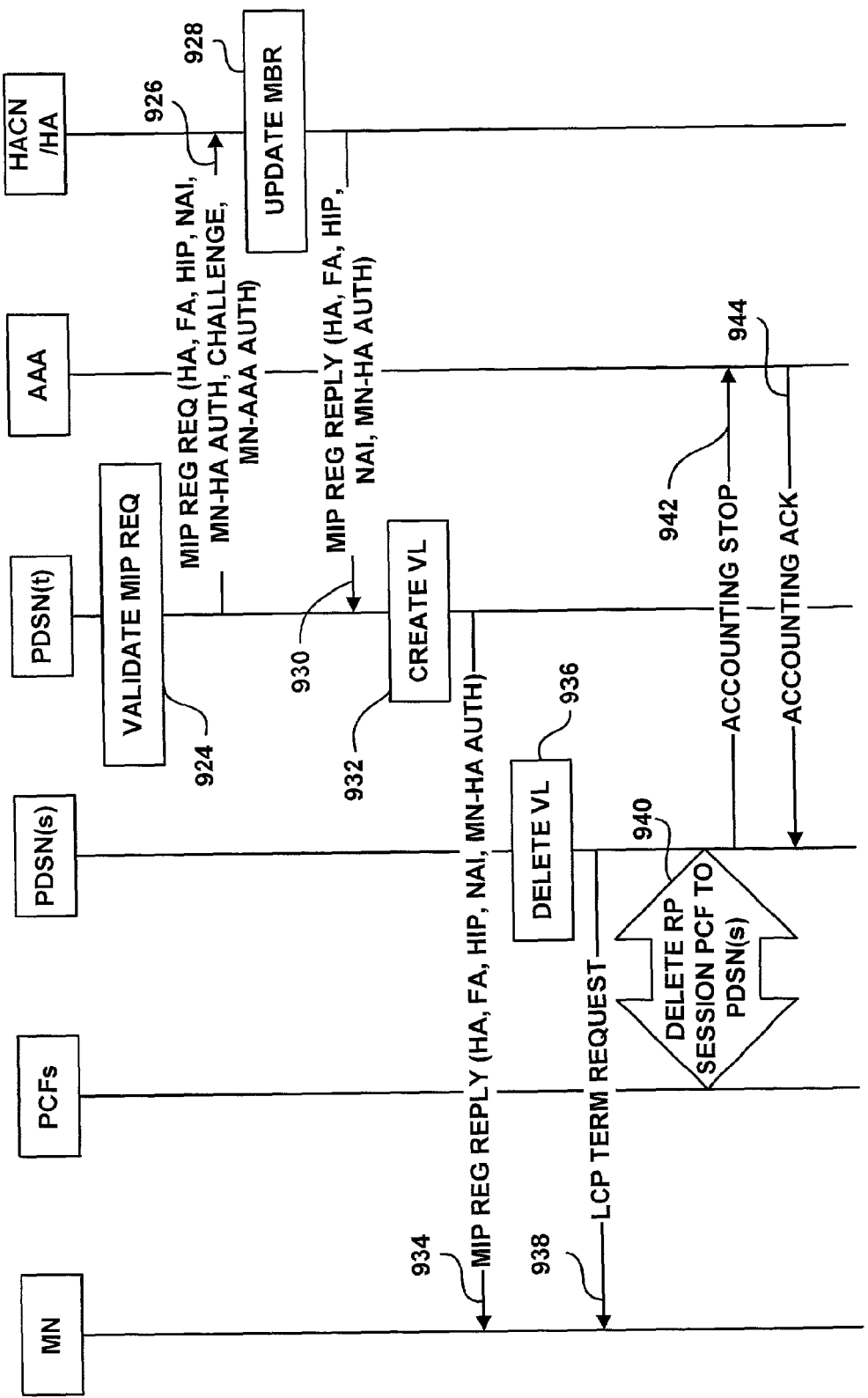
FIG. 9 shows a call-flow diagram one example of mobile IP inter-PDSN handoffs in accordance with a preferred embodiment of the present invention.

Referring now to FIG. 9, one example of mobile IP inter-PDSN handoffs is described. At step 902, an RP session is established and a PPP session is established between the mobile node and a PPP session is established between the mobile node and the first PDSN. At step 904, agent advertisement procedures occur. At step 906, a MIP session is established between the mobile node, the first PDSN and the HACN/HA. At step 908, an RP session is established between the mobile node and the second PDSN. At step 910, agent advertisement procedures occur between the mobile node and the second PDSN.

At step 912, a MIP registration request message is sent from the mobile node to the second PDSN. For example, the message may include the address of the home agent, and the address of the foreign agent. At step 914, the second PDSN validates the request. At step 916, the first PDSN marks the mobile node as dormant. At step 918, an access request message is sent from the second PDSN to the AAA server.

At step 920, the AAA server authenticates the user. At step 922, an access accept message is sent from the AAA server to the second PDSN. At step 924, the second PDSN validates the MIP request. At step 926, a MIP registration request is sent from the second PDSN to the HACN/HA. At step 928, the HACN/HA updates the MBR. At step 930, a MIP registration reply is sent from the HACN/HA to the second PDSN. At step 932, the second PDSN creates a VL.

At step 934, a MIP registration reply is sent from the second PDSN to the mobile node. At step 936, the first PDSN deletes the VL. At step 938, a LCP termination request message is sent from the first PDSN to the mobile node. At step 940, the session between the mobile node and the first PDSN is deleted. At step 942, an accounting stop message is sent from the first PDSN to the AAA server. At step 944, an accounting acknowledgement message is sent from the accounting server to the first PDSN.

Figure 10:
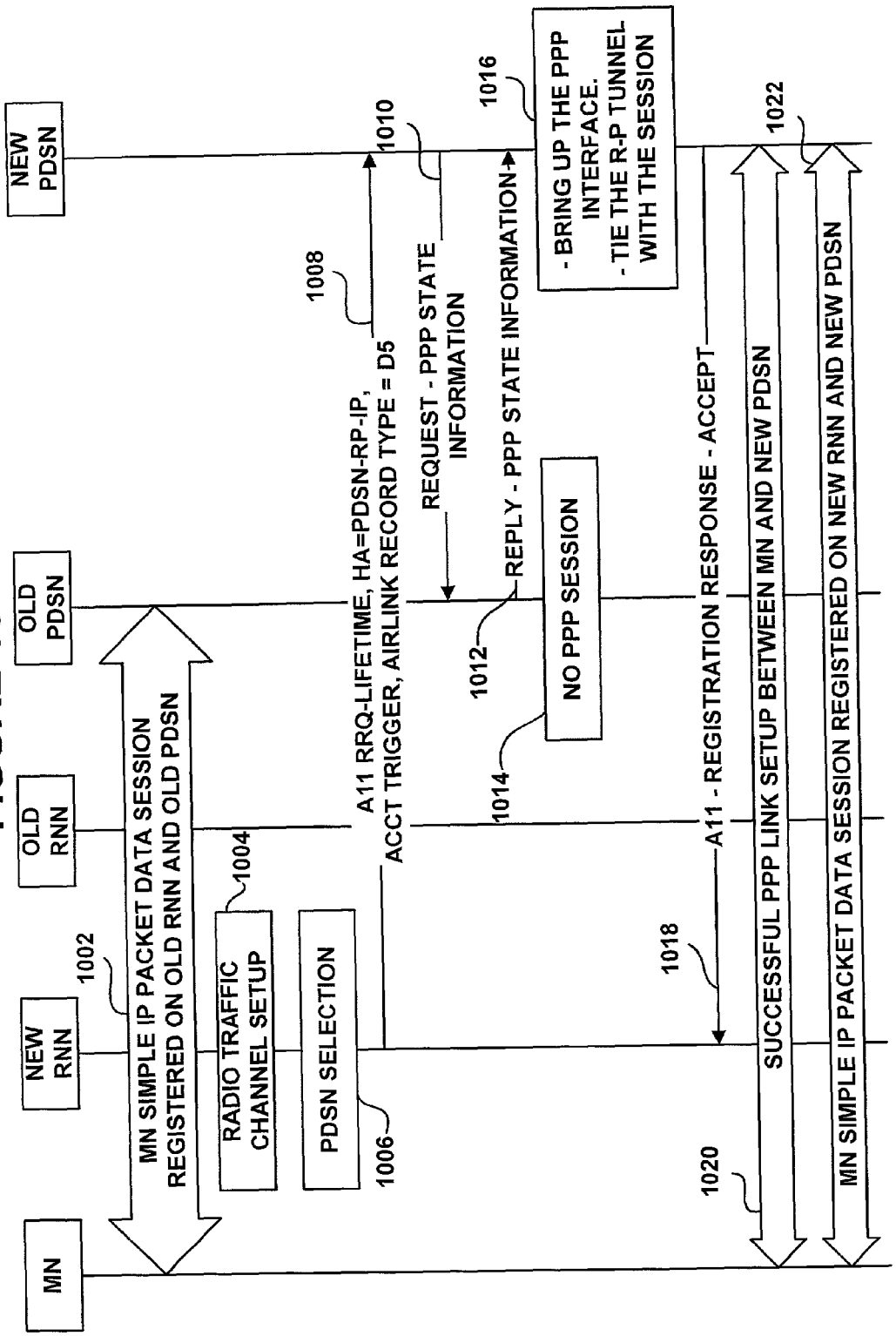
FIG. 10 shows a call-flow diagram one example of a simple IP, inter RNN, inter PDSN smooth handoff in accordance with a preferred embodiment of the present invention.

Referring now to FIG. 10, one example of a simple IP, inter RNN, inter PDSN smooth handoff is described. At step 1002, the mobile node establishes a simple IP packet data session, which is registered on a first PDSN and a first RNN. At step 1004, radio traffic channel setup occurs. At step 1006, the second RNN selects a second PDSN. At step 1008, a A11 registration request message is sent from the second RNN to the second PDSN. At step 1010, the second PDSN sends a request, for example, including a request for PPP state information, to the first PDSN. At step 1012, the first PDSN sends a reply to the second PDSN, including the requested state information. At step 1014, no PPP session is occurring at the first PDSN. At step 1016, the second PDSN activates the PPP interface, and ties the tunnel with the session. At step 1018, a registration response message, which accepts the session, is sent from the second PDSN to the second RNN. At step 1020, a successful PPP link setup between the mobile node and the second PDSN is active. At step 1022, the mobile node has registered a simple IP packet data session on the second PDSN and the second RNN.

Figure 11:
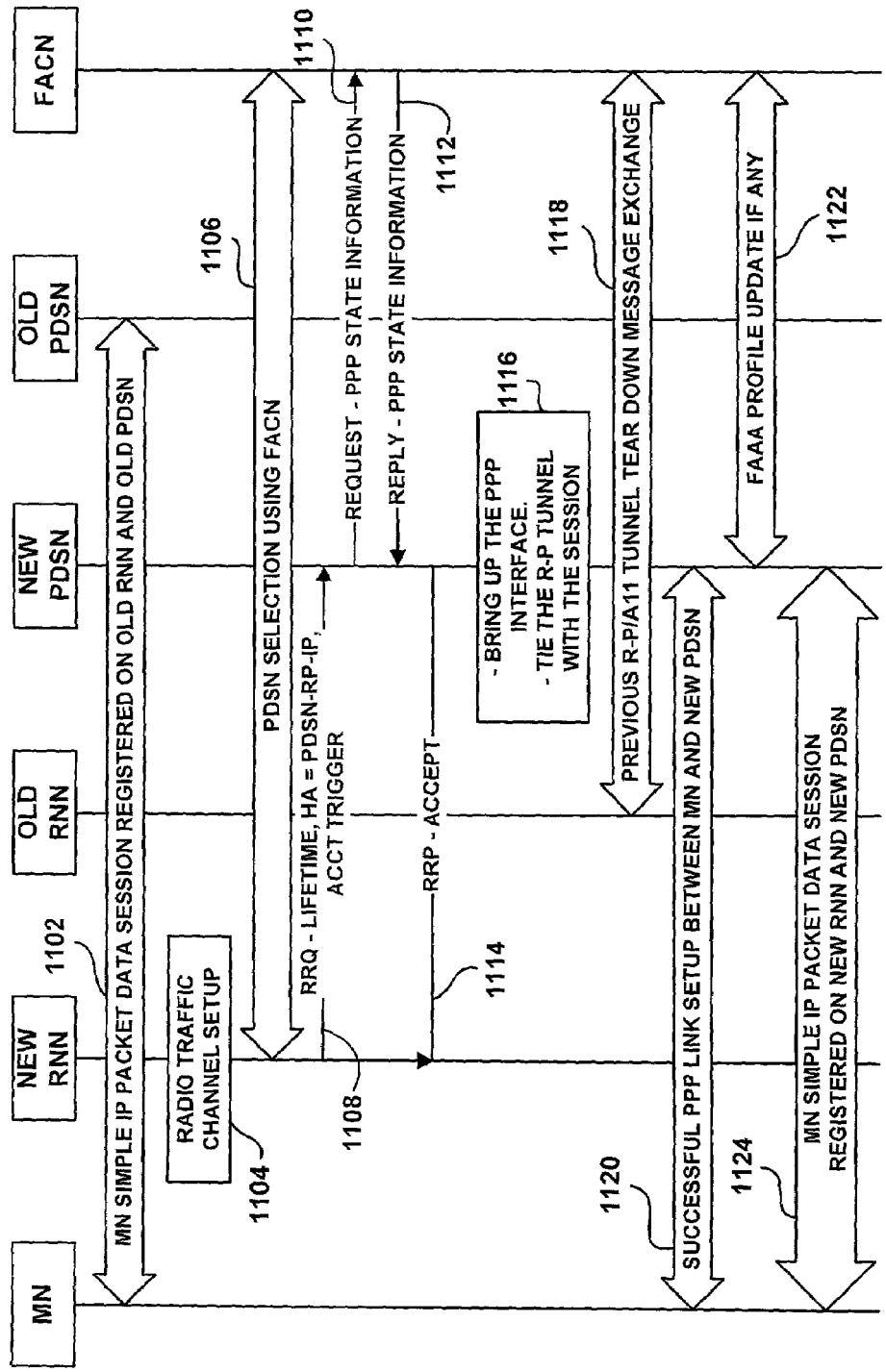
FIG. 11 shows a call-flow diagram, a simple IP, inter RNN, handover with PPP state involving the FACN in accordance with a preferred embodiment of the present invention.

Referring now to FIG. 11, a simple IP, inter RNN, handover with PPP state involving the FACN is described.

At step 1102, the mobile node establishes a simple IP packet data session, which is registered on a first RNN and on a first PDSN. At step 1104, a radio traffic channel setup is performed by the new RNN. At step 1106, new PDSN selection occurs using the FACN. The information is communicated to the new RNN from the FACN. At step 1108, a registration request message is sent from the second RNN to the second PDSN (Chosen by the FACN). At step 1110, a request for state information is sent from the second PDSN to the FACN. At step 1112, a reply message is sent from the FACN to the second PDSN. The reply may include the requested state information. At step 1114, an accept message is sent from the first PDSN to the second RNN. At step 1116, the second PDSN brings up a PPP interface, and ties the R-P tunnel with the session. At step 1118, the previous tunnel tear down message is sent between the first RNN an the FACN. At step 1120, a PPP link has been established between the mobile node and the second PDSN. At step 1122, an FAAA profile may be updates. At step 1124, the mobile node has registered a simple IP data packet session on the second RNN and the second PDSN.

Figure 12:
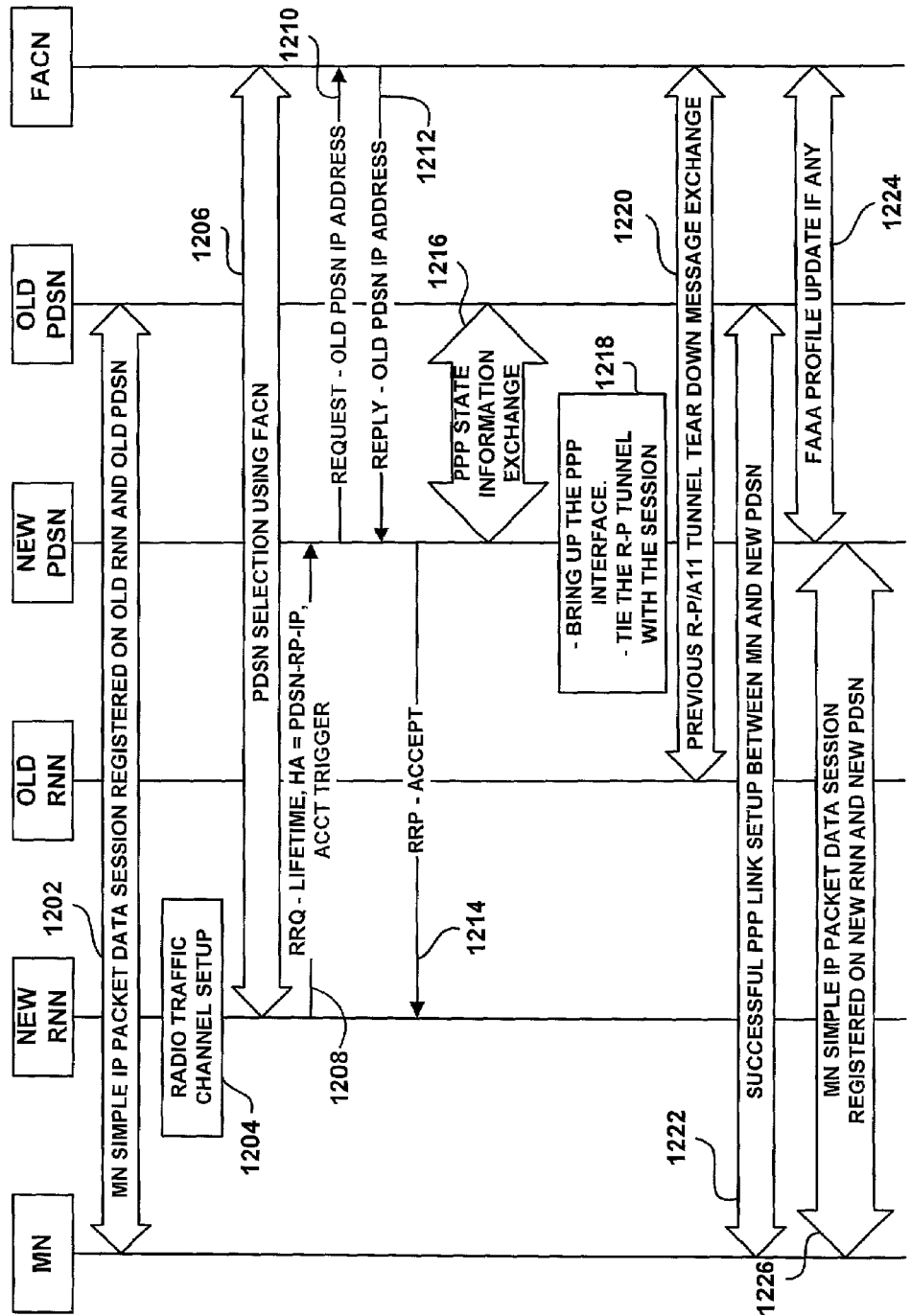
FIG. 12 shows a call-flow diagram one example of a simple IP, inter RNN, inter PDSN handover with a FACN in accordance with a preferred embodiment of the present invention.

Referring now to FIG. 12, one example of a simple IP, inter RNN, inter PDSN handover with a FACN is described. At step 1202, a mobile node has established an IP data session, which is registered on a first RNN and a first PDSN. At step 1204, the second RNN performs radio traffic channel setup. At step 1206, the FACN selects a new PDSN and communicates this second PDSN to the second RNN. At step 1208, the second RNN sends a registration request message from the second RNN to the second PDSN. At step 1210, the second PDSN sends a request to the FACN using the IP address of the first PDSN. At step 1212, the FACN sends a reply message to the second PDSN. At step 1241, the first PDSN sends an accept message to the second RNN. At step 1216, the first and second PDSN exchange state information. At step 1218, the second PDSN brings up a PDSN interface and ties the RP tunnel with the session. At step 1220, a tear-down message exchange occurs between the FACM and the first RNN. At step 1222, a PPP link has been established between the mobile node and the second PDSN. At step 1224 an FAAA profile update occurs, if needed, between the FACN and the second PDSN. At step 1226, the mobile node has successfully registered an IP data packet session between the second RNN and the second PDSN.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for smooth call handoffs may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method of establishing a call with a mobile node, the call having associated PPP state information, the method comprising:
    establishing a communication path between a first network device and a second network device, the first network device initially retaining the PPP state information and wherein the PPP state information comprises ACCM information, a LCP negotiated options list, an IP address, an AAA profile, a RADIUS profile, compression parameters, a compression dictionary, and header compression parameters; and
    transferring the PPP state information from the first network device to the second network device.

2. The method of claim 1 wherein the network devices are PDSNs.

3. The method of claim 1 further comprising selecting the second network device.

4. The method of claim 1 further comprising establishing the call between the mobile node and the first network device.

5. A system for maintaining a communication link with a mobile node comprising:
    a first network device, the first network device maintaining a call with the mobile node, the call including PPP state information and wherein the PPP state information is comprises from ACCM information, a LCP negotiated options list, an IP address, an AAA profile, a RADIUS profile, compression parameters, a compression dictionary, and header compression parameters; and
    a second network device coupled to the first network device, the first network device transferring the state information to the second network device upon a predetermined condition.

6. The system of claim 5 wherein the network devices are PDSNs.

7. A method for providing a handoff of a call from a mobile node, the call having associated state information, the method comprising:
    establishing the call between the mobile node and a first RNN and the mobile node and a first PDSN;
    thereafter, roaming the mobile node and establishing a link between the mobile node and a second RNN;
    selecting a second PDSN to service the mobile node;
    establishing a direct communication path between the first PDSN and the second PDSN; and
    exchanging the state information of the call between the first PDSN and the second PDSN using the communication path and wherein the state information is comprises ACCM information, a LCP negotiated options list, an IP address, an AAA profile, a RADIUS profile, compression parameters, a compression dictionary, and header compression parameters.

8. The method of claim 7 wherein the step of selecting a second PDSN is accomplished by a FACN.

9. The method of claim 7 wherein the step of selecting a second PDSN is accomplished by the second RNN.

10. The method of claim 7 further comprising using the state information to establish a data session.

11. The method of claim 8, wherein the FACN exchanges state information with the second PDSN.

12. A method of call handoff for a mobile node with a call, the call having associated state information, the method comprising:
 establishing a simple IP (SIP) session between the mobile node and a first PDSN;
 roaming the mobile node and establishing a link with a second RNN
 selecting a second PDSN to service the mobile node;
 sending a request to the second PDSN from the second RNN; and
 exchanging the state information of the call between the first PDSN and the second PDSN and wherein the state information is comprises from ACCM information a LCP negotiated options list, an IP address, an AAA profile, a RADIUS profile, compression parameters, a compression dictionary, and header compression parameters.

13. The method of claim 12 wherein the state information is used to establish a PPP data session between the mobile node and the second PDSN.

14. The method of claim 12 wherein the selection of the second PDSN is made by the FACN.

15. The method of claim 14 wherein the FACN facilitates a registration update between the first PDSN and the second PDSN.

16. A system for providing call handoffs with a mobile node, the mobile node having a call, the call having associated state information, the system comprising
 a mobile node, the mobile node being in a first coverage area;
 a first RNN being coupled to a first PDSN, the first RNN being initially communicatively coupled to the mobile node;
 a second PDSN;
 a second RNN having a second coverage area;
 wherein the mobile node roams from the first coverage area to the second coverage area, and a link is established with the second RNN; and
 wherein state information is exchanged between the first PDSN and the second PDSN and wherein the state information is comprises ACCM information, a LCP negotiated options list, an IP address, an AAA profile, a RADIUS profile, compression parameters, a compression dictionary, and header compression parameters.

17. The system of claim 16 wherein the second PDSN activates a PPP interface and ties an R-P tunnel with the session.

18. The system of claim 17 wherein the state information is used to establish a PPP session.

19. A system for providing call handoffs with a mobile node, the system comprising:
 a mobile node;
 a first RNN being coupled to a first PDSN, the first RNN being initially communicatively coupled to the mobile node, the first RNN having a first coverage area;
 a second PDSN;
 a second RNN having a second coverage area;
 a FACN communicatively coupled to the first PDSN and the second PDSN;
 wherein the mobile node roams away from the first coverage area to the second coverage area, and a link is established with the second RNN; and
 wherein state information is exchanged between the first PDSN and the FACN and the FACN and the second PDSN and wherein the state information is comprises ACCM information, a LCP negotiated options list, an IP address, an AAA profile, a RADIUS profile, compression parameters, a compression dictionary, and header compression parameters.

20. The system of claim 19 wherein the state information is used to establish a PPP session.

21. A system for providing a handoff of a call from a mobile node, the call having associated state information, the system comprising:
 means for establishing the call between the mobile node and a first RNN and the mobile node and a first PDSN;
 means for roaming the mobile node and establishing a link between the mobile node and a second RNN;
 means for selecting a second PDSN to service the mobile node;
 means for establishing a direct communication path between the first PDSN and the second PDSN; and
 means for exchanging the state information of the call between the first PDSN and the second PDSN using the communication path and wherein the state information is comprises ACCM information, a LCP negotiated options list, an IP address, an AAA profile, a RADIUS profile, compression parameters, a compression dictionary, and header compression parameters.

22. The system of claim 21 wherein the means for selecting a second PDSN includes a FACN.

23. The system of claim 21 wherein the means for selecting a second PDSN includes the second RNN.

24. The system of claim 21 further comprising means for using the state information to establish a data session.

25. The system of claim 22, wherein the FACN exchanges state information with the second PDSN.

26. A system of call handoff for a mobile node with a call, the call having associated state information, the system comprising:
 means for establishing a SIP session between the mobile node and a first PDSN;
 means for roaming the mobile node and establishing a link with a second RNN
 means for selecting a second PDSN to service the mobile node;
 means for sending a request to the second PDSN from the second RNN; and
 means for exchanging the state information of the call between the first PDSN and the second PDSN and where in the state information is comprises ACCM information, a LCP negotiated options list, an IP address, an AAA profile, a RADIUS profile, compression parameters, a compression dictionary, and header compression parameters.

27. A computer readable medium having stored therein instructions for causing a processing unit to execute the following method:
 establishing the call between the mobile node and a first RNN and the mobile node and a first PDSN;
 thereafter, roaming the mobile node and establishing a link between the mobile node and a second RNN;
 selecting a second PDSN to service the mobile node;

establishing a direct communication path between the first PDSN and the second PDSN; and exchanging the state information of the call between the first PDSN and the second PDSN using the communication path and wherein state information is comprises ACCM information, a LCP negotiated options list, an IP address, an AAA profile, a RADIUS profile, compression parameters, a compression dictionary, and header compression parameters.

28. A computer readable medium having stored therein instructions for causing a processing unit to execute the following method:

establishing an RP session between the mobile node and a first PDSN;

establishing a MIP session between the mobile node and the first PDSN;

establishing a RP session and PPP session between the mobile node and the second PDSN, the PPP session having PPP state information, the first PDSN retaining the state information and wherein state information is comprises ACCM information, a LCP negotiated options list, an IP address, an AAA profile, a RADIUS profile, compression parameters, a compression dictionary, and header compression parameters;

selecting a second PDSN to service the mobile node;

sending a request from the mobile node to the second PDSN for a MIP session; and transferring the state information from the first PDSN to the second PDSN.

29. A computer readable medium having stored therein instructions for causing a processing unit to execute the following method:

establishing a SIP session between the mobile node and a first PDSN;

roaming the mobile node and establishing a link with a second RNN selecting a second PDSN to service the mobile node;

sending a request to the second PDSN from the second RNN; and exchanging the state information of the call between the first PDSN and the second PDSN and wherein state information is comprises ACCM information, a LCP negotiated options list, an IP address, an AAA profile, a RADIUS profile, compression parameters, a compression dictionary, and header compression parameters.

* * * * *